US012579853B2

(12) United States Patent
Tanaka

(10) Patent No.: US 12,579,853 B2
(45) Date of Patent: Mar. 17, 2026

(54) VEHICLE ABNORMALITY DETECTION DEVICE AND VEHICLE ABNORMALITY DETECTION METHOD

(71) Applicant: Nissan Motor Co., Ltd., Kanagawa (JP)

(72) Inventor: Yasuhiro Tanaka, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 196 days.

(21) Appl. No.: 18/284,004

(22) PCT Filed: Mar. 25, 2021

(86) PCT No.: PCT/IB2021/000192
§ 371 (c)(1),
(2) Date: Sep. 25, 2023

(87) PCT Pub. No.: WO2022/200821
PCT Pub. Date: Sep. 29, 2022

(65) Prior Publication Data
US 2024/0169772 A1 May 23, 2024

(51) Int. Cl.
*G07C 5/00* (2006.01)
*G07C 5/08* (2006.01)

(52) U.S. Cl.
CPC ........... *G07C 5/0816* (2013.01); *G07C 5/008* (2013.01)

(58) Field of Classification Search
CPC .... G07C 5/0816; G07C 5/008; G05B 19/042; G05B 23/0237; G05B 2219/2637; B60R 16/0232
See application file for complete search history.

(56) References Cited

U.S. PATENT DOCUMENTS 8,155,823 B2 4/2012 Itoh
2009/0248238 A1 10/2009 Itoh
(Continued)

FOREIGN PATENT DOCUMENTS

CN 109460010 A 3/2019
CN 111506048 A * 8/2020 ........... G05B 23/027
(Continued)

OTHER PUBLICATIONS

Machine Translation of CN111506048 (Year: 2020).*
Machine Translation of JP2004302675 (Year: 2004).*

*Primary Examiner* — Anne Marie Antonucci
*Assistant Examiner* — Jordan T Smith
(74) *Attorney, Agent, or Firm* — Osha Bergman Watanabe & Burton LLP

(57) ABSTRACT

A vehicle abnormality detection device includes a receiver that receives: abnormality information data indicating that an abnormality has been detected from a first vehicle while traveling, first detection data detected from the first vehicle while stationary in a state in which the abnormality has occurred, and second detection data detected from a second vehicle while stationary. The vehicle abnormality detection device further includes a storage unit that stores the abnormality information data, and an abnormality determination unit that determines, using the first detection data and the second detection data, whether the second vehicle has the abnormality that is detected from the first vehicle while traveling. Finally, the vehicle abnormality detection device includes a transmitter that, when it is determined that the second vehicle has the abnormality, transmits the abnormality information data to a notification device that is provided in or related to the second vehicle.

8 Claims, 12 Drawing Sheets

(56) References Cited

U.S. PATENT DOCUMENTS

| | | | | |
|---|---|---|---|---|
| 2011/0130916 | A1* | 6/2011 | Mayer | B60L 3/0023<br>903/903 |
| 2016/0093119 | A1* | 3/2016 | Ahn | G07C 5/006<br>701/29.3 |
| 2018/0005132 | A1* | 1/2018 | Singh | G05B 23/0283 |
| 2018/0276912 | A1* | 9/2018 | Zhou | G05B 23/0275 |
| 2018/0295147 | A1* | 10/2018 | Haga | H04L 67/12 |
| 2020/0053112 | A1* | 2/2020 | Torisaki | H04L 63/1425 |
| 2020/0257298 | A1* | 8/2020 | Ucar | H04W 4/46 |
| 2020/0334926 | A1* | 10/2020 | Tsurumi | H04W 12/61 |
| 2021/0090359 | A1* | 3/2021 | Griffiths | B60W 50/0225 |
| 2021/0349997 | A1* | 11/2021 | Hirano | H04L 67/12 |
| 2021/0350636 | A1* | 11/2021 | Tang | G06N 3/045 |

FOREIGN PATENT DOCUMENTS

| | | | | |
|---|---|---|---|---|
| CN | 112046419 | A | | 12/2020 |
| JP | 2004302675 | A | * | 10/2004 |
| JP | 2009-227250 | A | | 10/2009 |

* cited by examiner

VEHICLE ABNORMALITY DETECTION DEVICE AND VEHICLE ABNORMALITY DETECTION METHOD

TECHNICAL FIELD

The present invention relates to a vehicle abnormality detection device and a vehicle abnormality detection method.

BACKGROUND ART

Patent Literature 1 discloses an in-vehicle device for detecting a fault that has occurred while a vehicle is traveling. The in-vehicle device receives fault information that is continuously output when the vehicle is diagnosed as having a fault, and determines that the reliability of the fault information is high when having received the fault information continuously up to a predetermined distance or more traveled by the vehicle.

CITATION LIST

Patent Literature

Patent Literature 1: Japanese Unexamined Patent Application Publication No. 2009-227250

SUMMARY OF THE INVENTION

Technical Problem

However, a vehicle needs to be traveling in order to detect faults that are detected while the vehicle is traveling but not detected while the vehicle has stopped, thereby wasting the energy for causing the vehicle to travel.

The present invention has been made in view of the above problem, and an object of the present invention is to provide a vehicle abnormality detection device and a vehicle abnormality detection method capable of detecting an abnormality in a second vehicle without consuming the energy that is necessary to cause the second vehicle to travel.

Technical Solution

In view of the above object, a vehicle abnormality detection device according to one aspect of the present invention includes: a receiver that receives abnormality information data indicating that an abnormality has been detected from a first vehicle while traveling, and first detection data detected from the first vehicle while stationary in a state in which the abnormality has occurred, and receives second detection data detected from a second vehicle while stationary, the second vehicle being different from the first vehicle; a storage unit that stores the abnormality information data in association with the first detection data; an abnormality determination unit that determines whether the second vehicle has the abnormality that is detected from the first vehicle while traveling, using the first detection data and the second detection data; and a transmitter that, when it is determined that the second vehicle has the abnormality, transmits the abnormality information data to a notification device that is provided in the second vehicle or is related to the second vehicle.

Advantageous Effect of the Invention

One aspect of the present invention makes it possible to detect an abnormality in a second vehicle without consuming the energy that is necessary to cause the second vehicle to travel.

DESCRIPTION OF EMBODIMENTS

Figure 1:
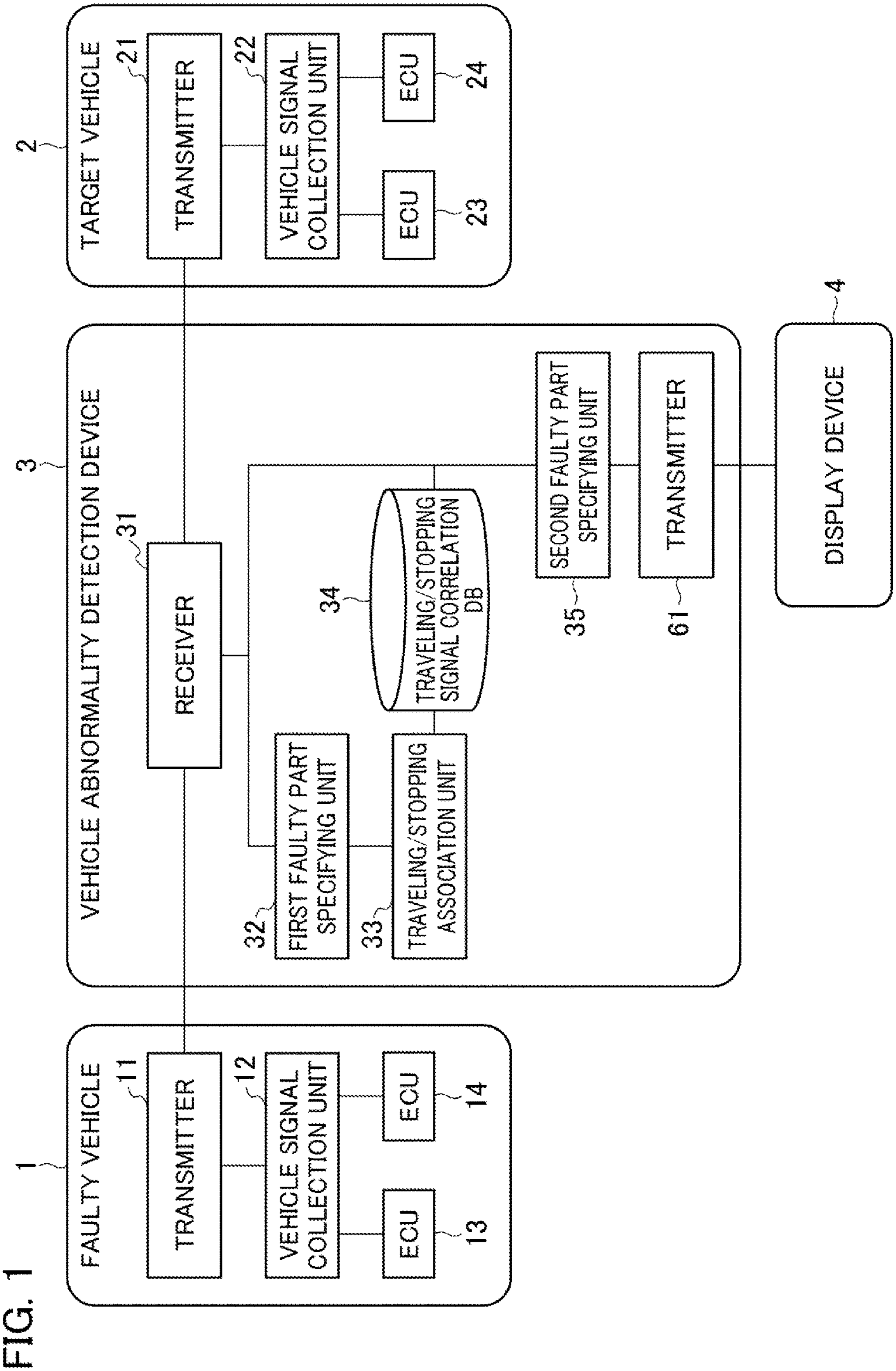
FIG. 1 is a block diagram illustrating an overall configuration of a vehicle abnormality detection system including a vehicle abnormality detection device 3 according to a first embodiment.

Embodiments of the present invention will be described below with reference to the drawings. In the drawings, the same parts are denoted by the same reference numerals and the description thereof is omitted.

First Embodiment

An overall configuration of a vehicle abnormality detection system including a vehicle abnormality detection device 3 according to a first embodiment will be described with reference to FIG. 1. The vehicle abnormality detection system includes a faulty vehicle 1 in which a fault (an example of abnormality) has been detected while traveling, a target vehicle 2 for which a fault detection is performed, a vehicle abnormality detection device 3 that performs a fault diagnosis of the target vehicle 2, and a display device 4 that displays a determination result.

A "target vehicle" is a vehicle in which the presence or absence of a fault is determined by the vehicle abnormality detection device 3, and examples thereof include a vehicle that is owned by a specific user and brought to a dealership selling vehicles (including a car dealer), a vehicle being developed or tested that has not yet been sold (hereafter referred to as a "development vehicle"), and a vehicle that has been left for a long time and has not been traveling. Meanwhile, a "faulty vehicle" is a vehicle for which the data used by the vehicle abnormality detection device 3, when performing a fault diagnosis of the target vehicle, has been detected.

In all embodiments, "abnormality" includes not only a fault whereby a vehicle is not normal, that is, fails to demonstrate the predetermined functions, capabilities, or characteristics originally possessed by the vehicle, but also includes problems that do not lead to a fault, and signs of a fault. Although a "fault" is described as an example of an "abnormality", there is no intention to limit the meaning of "abnormality" to a fault.

Each of the faulty vehicle 1 and the target vehicle 2 includes a plurality of electronic control units (ECUs) 13, 14, . . . and 23, 24, . . . for controlling the vehicles 1 and 2, and data is shared between these ECUs for controlling the vehicles 1 and 2. A CAN (controller area network) is used as a communication protocol for sharing. In automobiles, an in-vehicle network via CAN communication may be used to perform a fault diagnosis using CAN message data (hereinafter, CAN data), which is time-series data passing over the CAN.

Each of the faulty vehicle 1 and the target vehicle 2 further includes vehicle signal collection units 12 and 22 that collect CAN data and input and output data of the ECUs 13, 14, . . . and 23, 24, . . . (collectively referred to as "detection data"), and transmitters 11 and 21 that transmit the detection data to the vehicle abnormality detection device 3. The ECUs include gateway ECUs, in-vehicle infotainment (IVI) ECUs, telematics control units (TCU), engine control ECUs, charge control ECUs, power steering ECUs, air-bag ECUs, hybrid control ECUs, and transmission control ECUs.

The vehicle abnormality detection device 3 includes at least a receiver 31 that receives various data detected from the faulty vehicle 1 while traveling or stopped (an example of being stationary) and the target vehicle 2, a storage unit (traveling/stopping signal correlation database 34) that stores the received data, an abnormality determination unit (a second faulty part specifying unit 35) that uses the stored data to perform a fault diagnosis of the target vehicle 2, and a transmitter 61 that, when it is determined that there is a fault, transmits the fault data to a notification device (display device 4).

The receiver 31 receives abnormality information data indicating that an abnormality has been detected from the faulty vehicle 1 while traveling (first vehicle), and first detection data that is detected from the faulty vehicle 1 while stationary in a state in which a fault has occurred, and receives second detection data that is detected from the target vehicle 2 (second vehicle) while stationary, the target vehicle 2 being different from the faulty vehicle 1. The traveling/stopping signal correlation database (DB) 34 stores the abnormality information data in association with the first detection data. The abnormality information data at least indicates that an abnormality has been detected from the faulty vehicle 1 while traveling. The traveling/stopping signal correlation (DB) 34 stores CAN data (an example of the first detection data) with a label of "fault" (abnormality information data) attached to the CAN data. The faulty vehicle 1 when the first detection data is detected is in a state in which the fault has not been repaired yet, and the first detection data is the data detected when the faulty vehicle 1 has stopped (an example of being stationary).

"Stopped" includes a state in which a vehicle is not traveling but is capable of traveling. For example, "stopped" includes a state in which an engine has started, and a state in which a control unit necessary for traveling is switched on. "Stationary" includes a state in which a vehicle is not capable of traveling but in-vehicle air conditioning, acoustic equipment, and a navigation system are switched on, in addition to the "stopped" described above.

Using the first detection data and the second detection data, the second faulty part specifying unit 35 determines whether the target vehicle 2 has an abnormality that has been detected from the faulty vehicle 1 while traveling. The second faulty part specifying unit 35 compares the first detection data and the second detection data to determine whether the target vehicle 2 has an abnormality. When the second detection data is similar to the first detection data, the second faulty part specifying unit 35 determines that the same or similar fault has occurred in the target vehicle 2 as in the faulty vehicle 1 in which the first detection data has been detected. The second faulty part specifying unit 35 can at least specify that an abnormality has been detected using the abnormality information data associated with the first detection data. Further, the second faulty part specifying unit 35 may specify the portion of the vehicle where the abnormality has been detected and the portion of the vehicle where the abnormality has occurred which are included in the abnormality information data, and the components to be replaced/repaired.

When it is determined that the target vehicle 2 has a fault, the transmitter 61 transmits the abnormality information data to the display device 4. The display device 4 is an example of a notification device, and includes, for example, a device provided in the target vehicle 2 such as an operation screen of a navigation system mounted on the instrument panel of the target vehicle 2 or an operation screen of an audio system or an air conditioner, and a device related to the target vehicle 2 such as a user interface screen installed in a dealership (car dealer) that performs a fault diagnosis of the target vehicle 2 or a display screen of a portable terminal held by a salesperson of the dealership or by the user of the target vehicle 2. In addition to the display device 4, the notification device includes a voice output device that conveys diagnostic results by voice and a mail transmission device that conveys diagnostic results by e-mail.

The second faulty part specifying unit 35, when an abnormality is detected from the faulty vehicle 1 while traveling, determines whether the target vehicle 2 has an abnormality indicated by the abnormality information data associated with the first detection data, using the first detection data detected from the faulty vehicle while stationary and using the second detection data detected from the target vehicle while stationary 2. This makes it possible to determine the presence or absence of an abnormality detected while traveling, by using the detection data at the time of being stationary (first detection data and second detection data). An abnormality that is present while the vehicle is traveling but does not appear while the vehicle is stationary can be detected using the first and second detection data detected while the vehicle is stationary. That is, an abnormality that can be detected only when traveling can be detected without causing the target vehicle 2 to travel. For this reason, the energy required to cause the target vehicle 2 to travel is not consumed and can be conserved. In addition, even with a vehicle being developed or tested or a vehicle that has been left for a long time, it is not necessary to cause such a vehicle to travel and the presence or absence of an abnormality that occurs when traveling can be determined while the vehicle is in a stationary state.

The vehicle abnormality detection device 3 may include the receiver 31, a first faulty part specifying unit 32, a traveling/stopping association unit 33, the traveling/stopping signal correlation DB 34, the second faulty part specifying unit 35, and the transmitter 61. The first faulty part specifying unit 32 specifies a faulty part of the faulty vehicle 1 from the first detection data. For example, the first faulty part specifying unit 32 acquires a fault code from the CAN data and specifies the faulty part of the faulty vehicle 1 from the fault code.

A DTC (diagnostic trouble code) which is configured of one alphabet letter and four digits is used as an example of a "fault code". The DTC is a fault code for on-board diagnostics 2 (OBD2) programmed into a plurality of electronic control units (ECU) that control transport equipment such as automobiles. The DTCs have been standardized by international standards and other standards, and some are commonly defined by all automakers, while others are freely defined by each automaker. When a vehicle breaks down, a fault diagnosis device (an example of a vehicle fault detection device 3) is connected at a car dealer to acquire a DTC, and a faulty part can be replaced or repaired by specifying at least either a faulty part or a cause of the fault from the DTC. The type of fault may be used in place of the faulty part. By specifying the type of fault, repairs can be performed for each type of fault, even if a fault occurs in various situations.

The traveling/stopping association unit 33 may generate teaching data that associates the detection data (fourth detection data) detected from the faulty vehicle 1 while traveling in a state in which a fault has occurred with the first detection data and the abnormality information data. Further, the detection data (fifth detection data) detected from the faulty vehicle 1 while stopped in a normal state in which a fault has not occurred may be added thereto. The teaching data may be generated by associating at least one of the faulty part and a cause of the fault specified by the first faulty part specifying unit 32 with the first detection data. By increasing the number of pieces of information to be associated, the information (faulty part, type of fault, cause of fault, CAN data at the time of traveling, DTC) specified by the second faulty part specifying unit 35 also increases. The teaching data described above are stored in the traveling/stopping signal correlation DB 34.

The second faulty part specifying unit 35 has learning models for specifying the presence or absence of a fault, a faulty part, a type of fault, and a cause of a fault using the teaching data generated by the traveling/stopping association unit 33. These learning models may be generated using machine learning such as gradient boosting, a Bayesian network, and deep learning, or they may be generated based on rules. Thus, even a fault that occurs in various situations can be specified as a fault in a predetermined portion. In addition, a cause of fault can be specified.

An example of the operation of the vehicle abnormality detection device 3 in FIG. 1 will be described with reference to FIG. 2A. First, the traveling/stopping association unit 33 generates teaching data in step S10, and the processing proceeds to step S20 where the second faulty part specifying unit 35 generates a learning model using the teaching data. Thereafter, in step S30, the second faulty part specifying unit 35 performs a fault diagnosis of the target vehicle 2 using the learning model, and the processing proceeds to step S40 where the transmitter 61 transmits the diagnosis result to the display device 4.

The detailed procedures of each step S10 to S40 will be described. In step S101, the receiver 31 receives the detection data (fourth detection data) detected from the faulty vehicle 1 while traveling in a state in which a fault has occurred, from the faulty vehicle 1. In step S102, the receiver 31 receives the detection data (first detection data) detected from the faulty vehicle 1 while stopped in a state in which a fault has occurred, from the faulty vehicle 1.

Figure 2A:
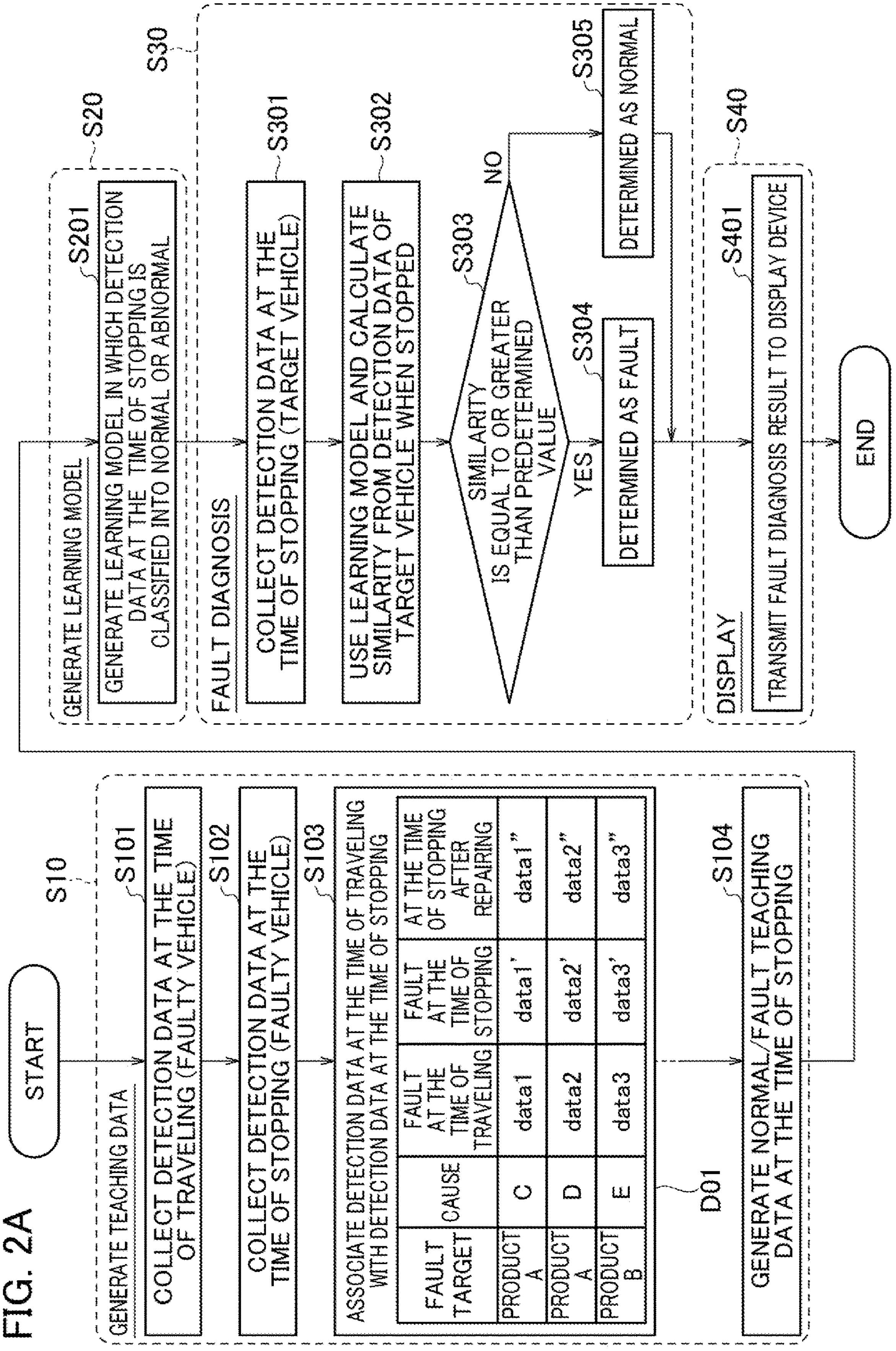
FIG. 2A is a flowchart illustrating an example of an operation of the vehicle abnormality detection device 3 in FIG. 1 and illustrating an example in which similarity is calculated using a learning model.

The processing proceeds to step S103, and as illustrated in teaching data D01 in FIG. 2A, the traveling/stopping association unit 33 generates normal/fault teaching data at the time of stopping by associating the fourth detection data (data 1, data 2, data 3), the first detection data (data 1', data 2', data 3'), the abnormality information data (fault target, cause) with the fifth detection data (data 1", data 2", data 3") detected from the faulty vehicle 1 while stopped in a normal state in which a fault has not occurred (step S104). The processing proceeds to step S201, and the second faulty part specifying unit 35 (learning model generation unit) generates a learning model for classifying the teaching data at the time of stopping into normal or abnormal using the teaching data.

The processing proceeds to step S301, and the receiver 31 receives the second detection data detected from the target vehicle 2 while stopped. The processing proceeds to step S302, and the second faulty part specifying unit 35 uses the first detection data and the second detection data, and the learning model that is generated in step S201, to determine whether the target vehicle 2 has an abnormality detected from the faulty vehicle 1 while traveling. Specifically, the second faulty part specifying unit 35 uses the learning model generated in step S201 to calculate the similarity between the second detection data and the first detection data. One example of the calculation method using the learning model generated in step S201 is gradient boosting. In this case, a precision ratio calculated in gradient boosting can be used as an example of the similarity. The ratio of the number of items with which the first detection data and the second detection data match from among the predetermined number of items to be checked is calculated as a precision ratio.

When the similarity is equal to or greater than a predetermined value (YES in S303), the second faulty part specifying unit 35 determines that the fault indicated in the abnormality information data (fault target and cause in teaching data D01) is present in the target vehicle 2. When the similarity is less than the predetermined value (NO in S303), the second faulty part specifying unit 35 determines that there is no fault in the target vehicle 2. In step S401, the transmitter 61 transmits the diagnostic result including at least the presence or absence of the fault, to the display device 4.

As described above, the receiver 31 further receives the third detection data detected from the faulty vehicle 1 while stopped in a normal state in which a fault has not occurred. The second faulty part specifying unit 35 (learning model generation unit) generates a learning model using the third detection data and the first detection data. The second faulty part specifying unit 35 determines whether the target vehicle 2 has a fault from the second detection data using the trained learning model. A learning model is used that is learnt by using the third detection data that is detected from the faulty vehicle 1 while stopped in a normal state in which a fault has not occurred (for example, after repairing a fault) and the first detection data. This makes it possible to determine whether the second detection data is similar to the detection data at the time of stopping when a fault has occurred or similar to the detection data at the time of stopping in a normal state, thereby making it possible to accurately determine the presence or absence of a fault. For example, after the faulty part is repaired, it is possible to accurately confirm that the fault is no longer present without causing the target vehicle 2 to travel.

When the similarity between the first detection data and the second detection data is equal to or greater than a threshold value, the second faulty part specifying unit 35 determines that there is a fault. By determining the presence or absence of a fault based on the similarity between the first and second detection data, the presence or absence of a fault can be accurately detected.

Modified Example

In the example of the operation of the vehicle abnormality detection device 3 described with reference to FIG. 2A, the learning model is generated and the similarity between the second detection data and the first detection data is calculated using the learning model. However, there is a method that does not use the learning model as the method for calculating the similarity. For example, there is a method that calculates the similarity using principal component analysis.

Figure 2B:
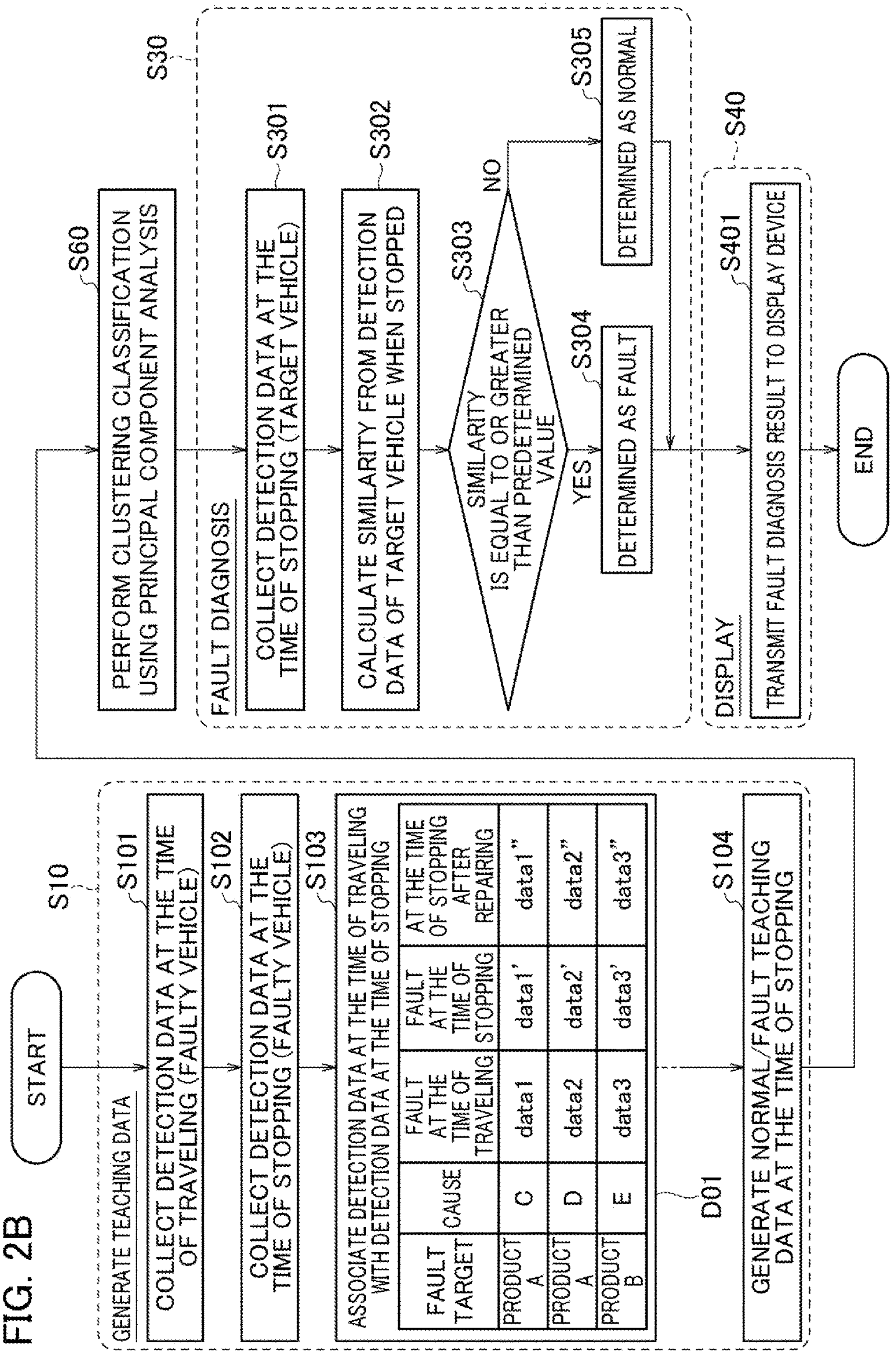
FIG. 2B is a flowchart illustrating another example of an operation of the vehicle abnormality detection device 3 in FIG. 1 and illustrating an example in which similarity is calculated without using a learning model.

Specifically, as illustrated in FIG. 2B, after step S104, the processing proceeds to step S60 without performing step S20 of FIG. 2A, that is, without performing step S201 for generating the learning model. In step S60, the normal/fault teaching data at the time of stopping generated in step S104 is classified into normal clusters and fault clusters using principal component analysis. Then, the processing proceeds to step S30. In step S302, when the detection data of the target vehicle when stopped is projected into the principal component analysis, the similarity with each cluster is calculated by calculating the Mahalanobis distance as information distance from the gravity of each cluster. Here, the cluster classification method is not limited to principal component analysis, and the information distance is not limited to Mahalanobis distance. Moreover, in the cluster classification, after the dimension reduction is carried out by the principal component analysis, for example by mapping in two dimensions, the classification may be carried out by a clustering method such as the k-means method.

Second Embodiment

Figure 3:
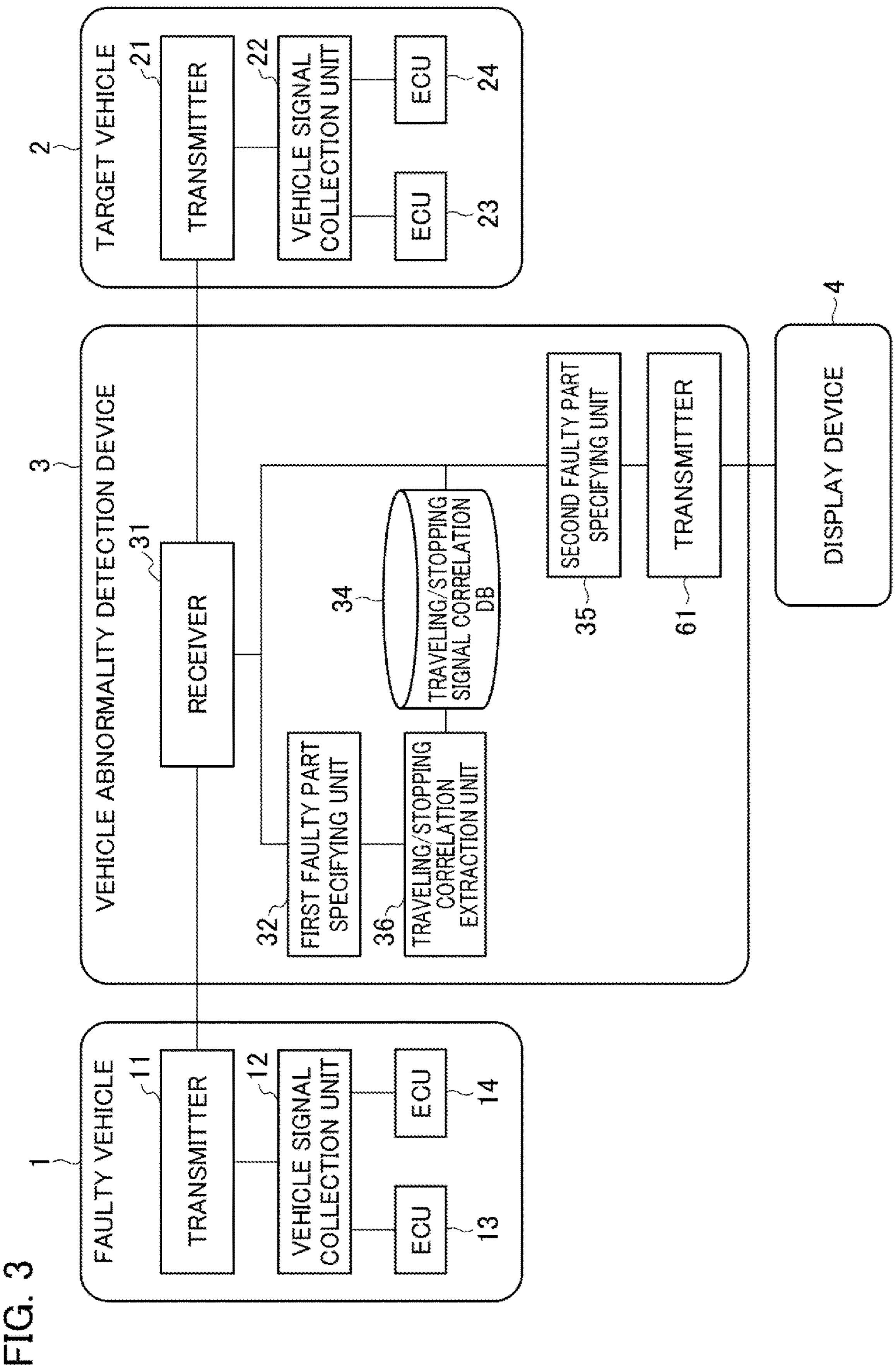
FIG. 3 is a block diagram illustrating an overall configuration of a vehicle abnormality detection system including a vehicle abnormality detection device 3 according to a second embodiment.

The overall configuration of the vehicle abnormality detection system including the vehicle abnormality detection device 3 according to a second embodiment will be described with reference to FIG. 3. The same components as those in FIG. 1 are denoted by the same reference numerals and the description thereof is omitted. The vehicle fault detection system in FIG. 3 differs in that the vehicle fault detection system includes a traveling/stopping correlation extraction unit 36 instead of the traveling/stopping association unit 33 in FIG. 1, and the other configurations are the same.

The traveling/stopping correlation extraction unit 36 extracts signals that change in a common manner between the fourth detection data detected from the faulty vehicle 1 while traveling in a state in which a fault has occurred and the first detection data detected from the faulty vehicle 1 while stopped in a state in which a fault has occurred. Alternatively, a portion may be extracted in which the correlation among signals is different in a common manner from the detection data in the normal state. The traveling/stopping correlation extraction unit 36 extracts, as the first detection data, a portion that diverges from the third detection data by a predetermined value or more, out of the whole first detection data detected from the faulty vehicle 1 while stationary and received by the receiver 31. As a result, the amount of data processed by the second faulty part specifying unit 35 is reduced, and thus the calculation cost can be reduced and the efficiency of fault diagnosis can be improved.

Figure 4:
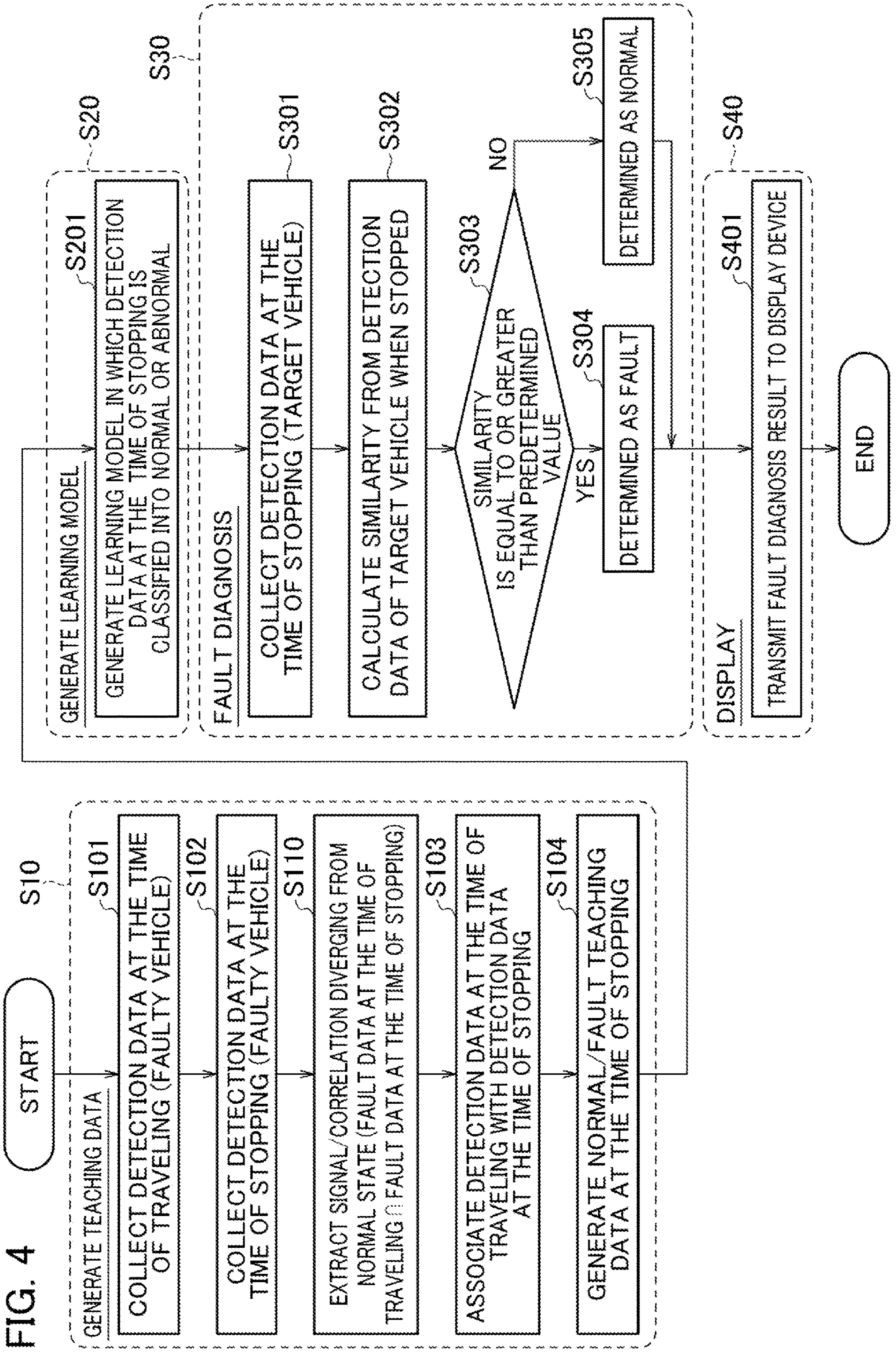
FIG. 4 is a flowchart illustrating an example of an operation of the vehicle abnormality detection device 3 in FIG. 3.

An example of the operation of the vehicle abnormality detection device 3 in FIG. 3 will be described with reference to FIG. 4. The same steps as those in FIG. 2A are denoted by the same reference numerals and the description thereof is omitted. The vehicle abnormality detection method in FIG. 4 differs in that step S110 is performed after step S102 and before step S103 in FIG. 2A. That is, step S110 is added in FIG. 4, and the other configurations are the same.

After receiving the fourth detection data and the first detection data, the processing proceeds to step S110, and the traveling/stopping correlation extraction unit 36 extracts a signal or a correlation that diverges from the detection data in the normal state out of the fourth detection data and the first detection data. Of the common portions of the data at the time of traveling (fourth detection data) and the data at the time of (first detection data), a portion that diverges from the detection data in the normal state may be extracted. In step S103, the traveling/stopping association unit 33 associates the extracted portion of the fourth detection data (data 1, data 2, data 3) with the extracted portion of the first detection data (data 1', data 2', data 3').

Third Embodiment

Figure 5:
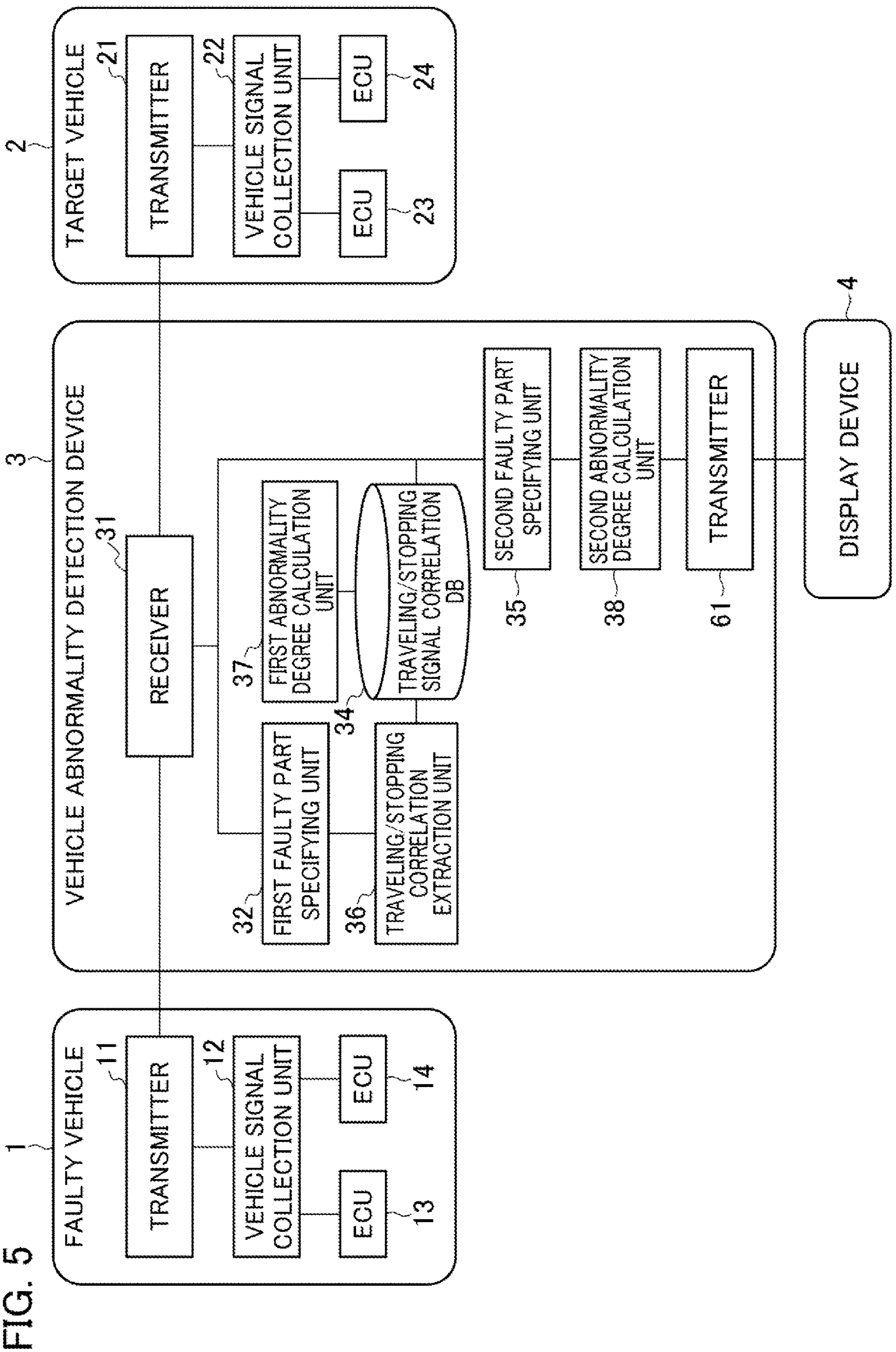
FIG. 5 is a block diagram illustrating an overall configuration of a vehicle abnormality detection system including a vehicle abnormality detection device 3 according to a third embodiment.

The overall configuration of the vehicle abnormality detection system including the vehicle abnormality detection device 3 according to a third embodiment will be described with reference to FIG. 5. The same components as those in FIG. 3 are denoted by the same reference numerals and the description thereof is omitted. The vehicle abnormality detection system in FIG. 5 differs from that in FIG. 3 in that the vehicle abnormality detection system further includes a first abnormality degree calculation unit 37 and a second abnormality degree calculation unit 38 (abnormality degree calculation unit), and the other configurations are the same.

The first abnormality degree calculation unit 37 calculates an abnormality degree obtained by quantifying the amount of deviation from a normal state. The first abnormality degree calculation unit 37 calculates the abnormality degree of the faulty vehicle 1 by comparing the first detection data detected from the faulty vehicle 1 while stopped in a state in which a fault has occurred with the third detection data detected from the faulty vehicle 1 while stopped in a normal state in which a fault has not occurred.

For example, the first abnormality degree calculation unit 37 calculates an abnormality degree a(x') using the following equation (1).

$$a(x')=\{(x'-m)^2\}/2s^2 \tag{1}$$

Here, in the equation (1), [x'] is the first detection data of the faulty vehicle 1, [m] is the sixth detection data detected from the faulty vehicle 1 while stopped in a normal state, and [s] is the standard deviation of the sixth detection data.

The first faulty part specifying unit 32 compares the calculated abnormality degree with a preset abnormality degree threshold value, and when the abnormality degree exceeds the abnormality degree threshold value, it may be determined that a fault has occurred in the faulty vehicle 1. The method for calculating the abnormality degree is not limited to the above method. The traveling/stopping correlation extraction unit 36 may generate teaching data D01 by associating a calculated abnormality degree with an extracted portion.

The second abnormality degree calculation unit 38 (abnormality degree calculation unit) calculates the abnormality degree by comparing the second detection data detected from the target vehicle 2 while stopped with the detection data detected from the target vehicle 2 while stopped in a normal state in which a fault has not occurred. Using the same method for calculating the abnormality degree used by the first abnormality degree calculation unit 37, the second abnormality degree calculation unit 38 can calculate the abnormality degree of the target vehicle 2 when traveling from the detection data of the target vehicle 2 while stopped. The transmitter 61 transmits the calculated abnormality degree of the target vehicle 2 to the display device 4 as part of the fault diagnosis result. This makes it possible to acquire an index for determining the repair timing and repair priority of the target vehicle 2.

The second abnormality degree calculation unit 38 may further calculate a relative value of the abnormality degree of the target vehicle 2 based on the abnormality degree of the faulty vehicle 1, from the abnormality degree of the target vehicle 2. The transmitter 61 transmits the relative value mentioned above in place of the calculated abnormality degree of the target vehicle 2 or together with the abnormality degree of the target vehicle 2, to the display device 4 as part of the fault diagnosis result. This makes it possible to acquire an index for determining the repair timing and repair priority of the target vehicle 2.

Figure 6:
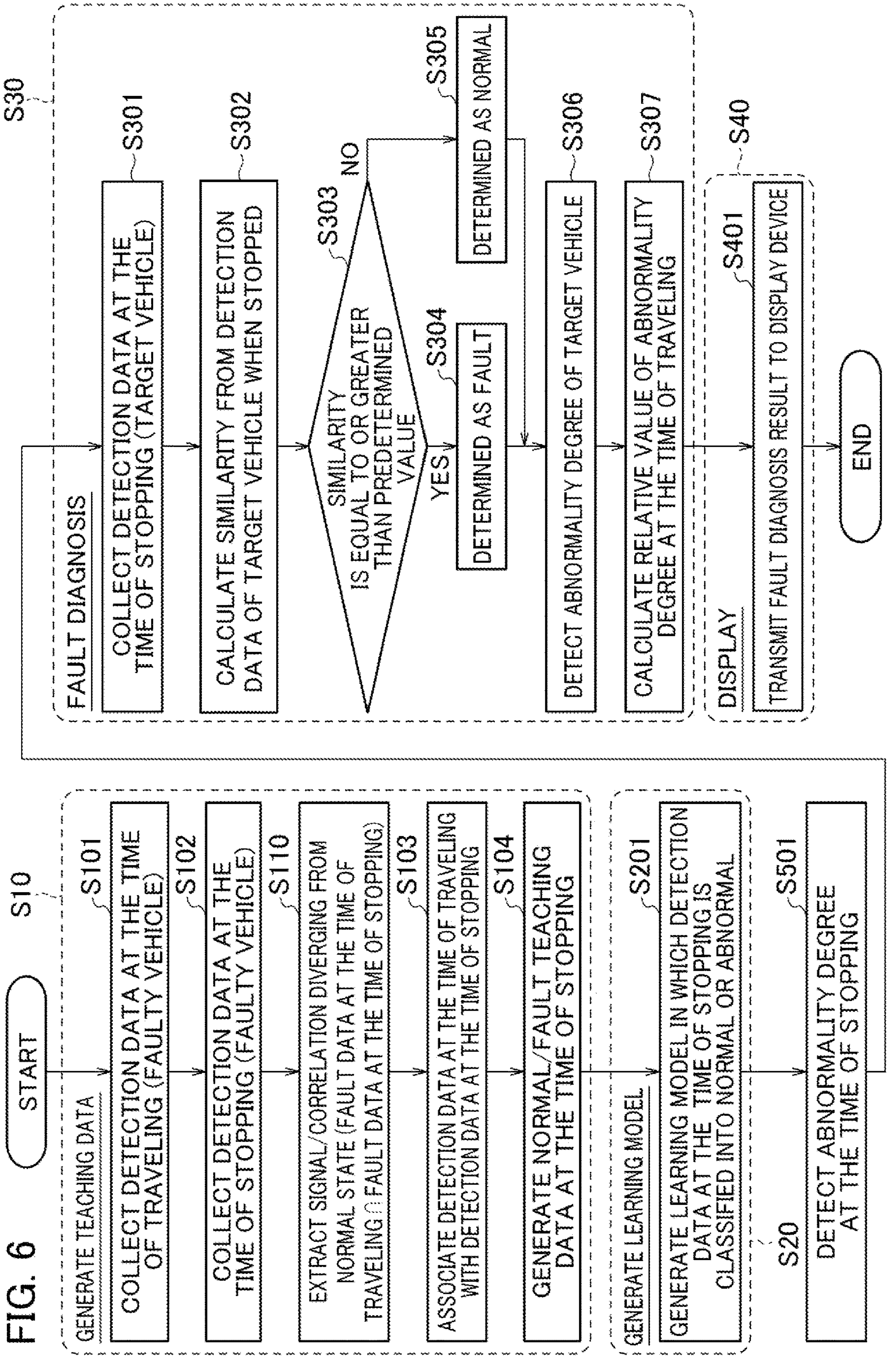
FIG. 6 is a flowchart illustrating an example of an operation of the vehicle abnormality detection device 3 in FIG. 5.

An example of the operation of the vehicle abnormality detection device 3 in FIG. 5 will be described with reference to FIG. 6. The same steps as those in FIG. 4 are denoted by the same reference numerals and the description thereof is omitted. The vehicle abnormality detection method in FIG. 6 differs in that step S501 is added after step S201 and before step S301 in FIG. 4 and steps S306 and S307 are added after the determination of the presence or absence of a fault (S304 and S305) and before the transmission of the diagnostic result (S401), and the other configurations are the same.

After generating the learning model, the processing proceeds to step S501, and the first abnormality degree calculation unit 37 calculates the abnormality degree a(x') of the faulty vehicle 1 when stopped, using the equation (1).

After determining whether there is a fault using the similarity, the processing proceeds to step S306, and the second abnormality degree calculation unit 38 calculates the abnormality degree of the target vehicle 2 using the equation (1), which is the same calculation method used by the first abnormality degree calculation unit 37. The processing proceeds to step S307, and the second abnormality degree calculation unit 38 calculates the relative value of the abnormality degree of the target vehicle 2 based on the abnormality degree of the faulty vehicle 1. In other words, the relative value of the abnormality degree of the target vehicle 2 is divided by the abnormality degree of the faulty vehicle 1 to calculate the relative value described above. In step S401, the transmitter 61 transmits the calculated abnormality degree of the target vehicle 2 and the relative value thereof, to the display device 4 as part of the fault diagnosis result.

Fourth Embodiment

Figure 7:
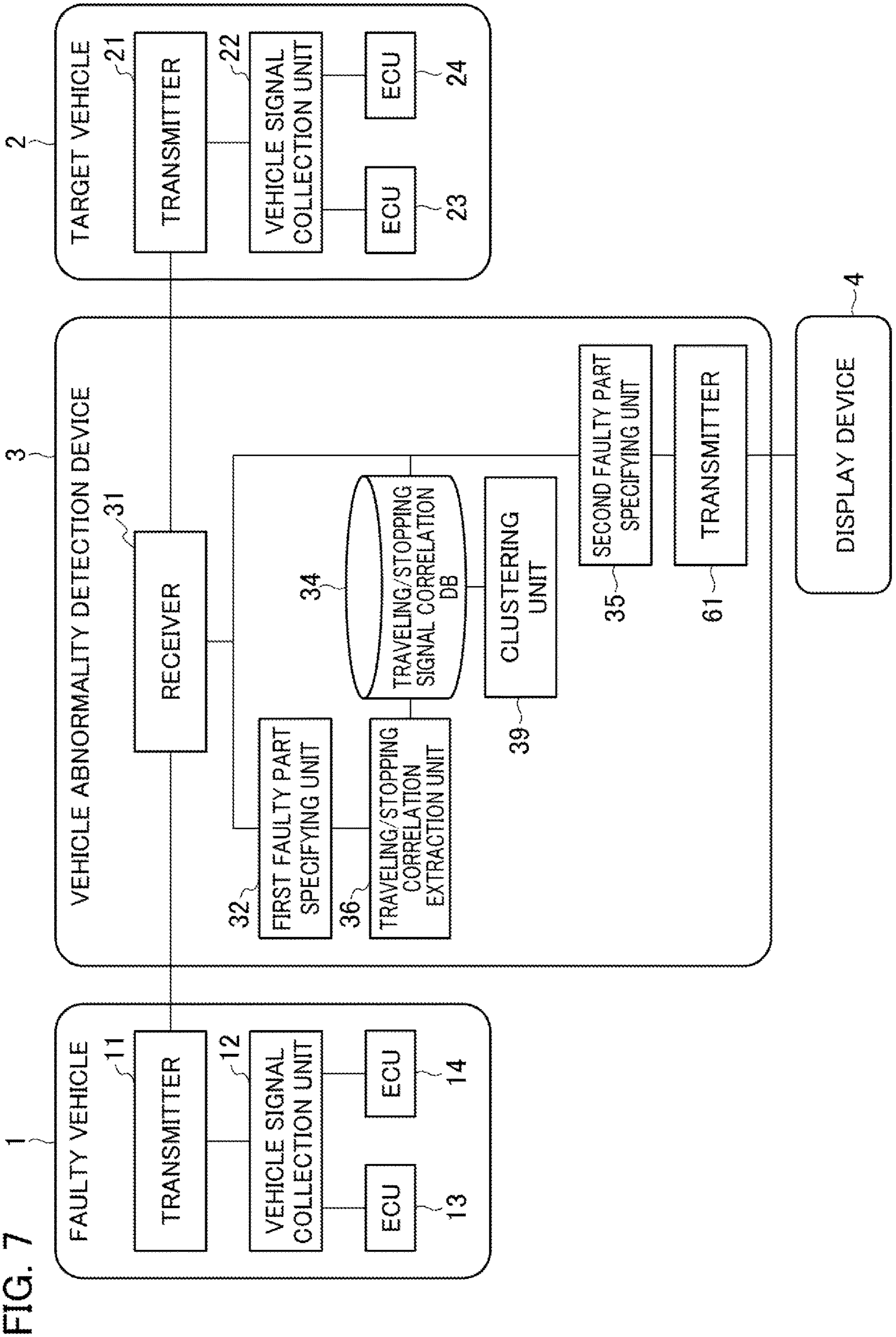
FIG. 7 is a block diagram illustrating an overall configuration of a vehicle abnormality detection system including a vehicle abnormality detection device 3 according to a fourth embodiment.

The overall configuration of the vehicle abnormality detection system including the vehicle abnormality detection device 3 according to a fourth embodiment will be described with reference to FIG. 7. The same components as those in FIG. 3 are denoted by the same reference numerals and the description thereof is omitted. The vehicle abnormality detection system in FIG. 7 differs from that in FIG. 3 in that the vehicle abnormality detection system further includes a clustering unit 39, and the other configurations are the same.

The receiver 31 further receives the fourth detection data detected from the faulty vehicle 1 while traveling in a state in which a fault has occurred, and the fifth detection data detected from the faulty vehicle 1 while traveling in a normal state in which a fault has not occurred. The clustering unit 39 confirms the relationship between a signal or correlation extracted by the traveling/stopping correlation extraction unit 36 and the fault by clustering the various detection data (fourth detection data and fifth detection data) of the faulty vehicle 1 when traveling that includes a normal mode and a plurality of fault modes. This make it possible to classify the faulty part specified by the second faulty part specifying unit 35 and other possible faulty parts. That is, clustering the fourth detection data and fifth detection data serves as a double-check function for fault diagnosis, and thus the faulty part can be specified with high accuracy among from many faulty parts.

Figure 8:
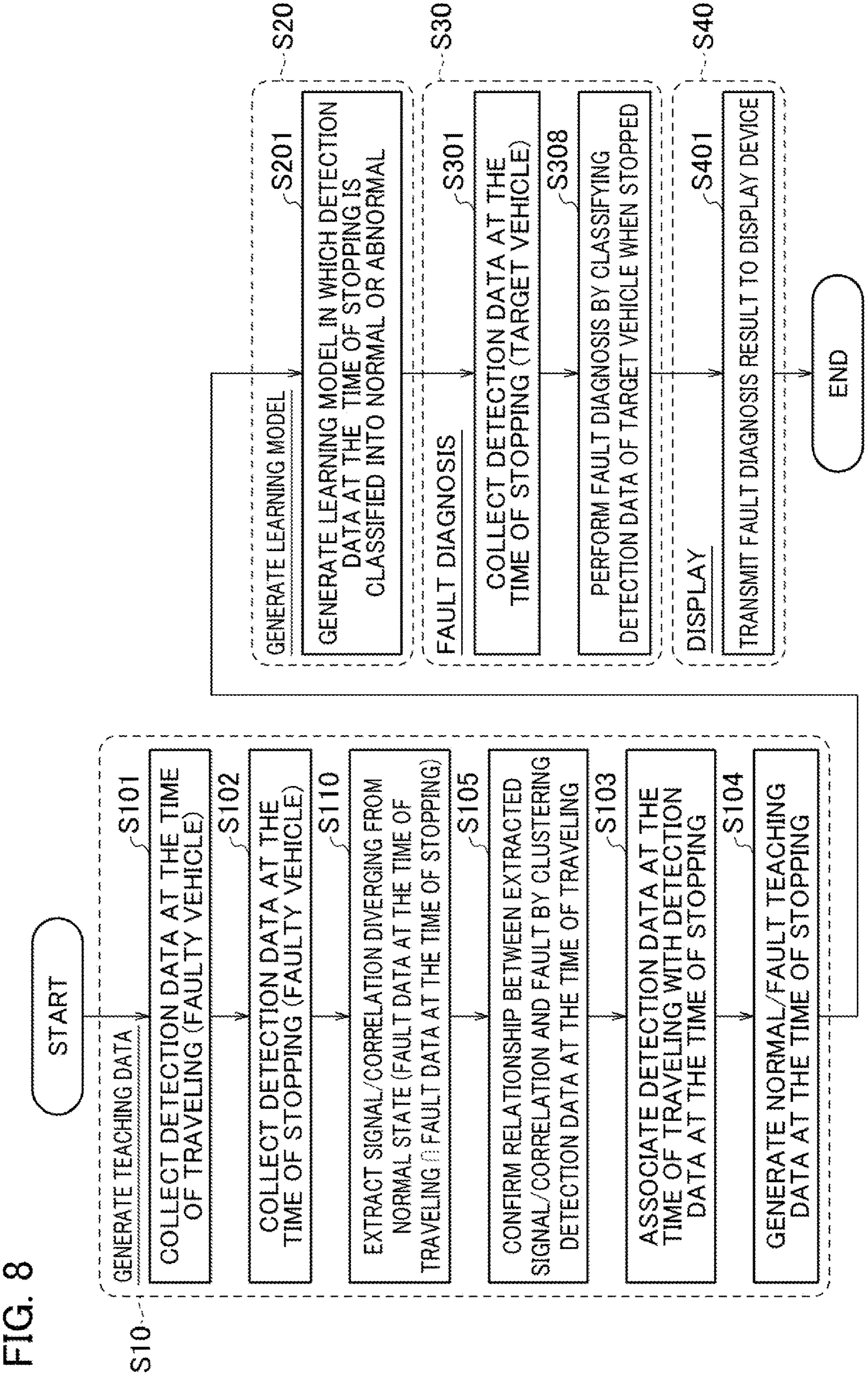
FIG. 8 is a flowchart illustrating an example of an operation of the vehicle abnormality detection device 3 in FIG. 7.

An example of the operation of the vehicle abnormality detection device 3 in FIG. 7 will be described with reference to FIG. 8. The same steps as those in FIG. 4 are denoted by the same reference numerals and the description thereof is omitted. The vehicle abnormality detection method in FIG. 8 differs in that step S105 is added after step S110 and before step S103 in FIG. 4 and step S308 is performed instead of steps S302, S303, S304 and S305 in FIG. 4, and the other configurations are the same.

After extracting the signal or correlation (S110), the processing proceeds to step S105, and the clustering unit 39 confirms the relationship between the signal or correlation extracted by the traveling/stopping correlation extraction unit 36 and the fault by clustering the various detection data (fourth detection data and fifth detection data) of the faulty vehicle 1 when traveling that includes a normal mode and a plurality of fault modes. Thereafter, the processing proceeds to step S103.

After the receiver 31 has received the second detection data detected from the target vehicle 2 while stopped (S301), the processing proceeds to step S308, and the second faulty part specifying unit 35 performs the fault diagnosis by classifying the second detection data of the target vehicle 1 using gradient boosting. This make it possible to classify the estimated faulty part and other possible faulty parts with high accuracy.

Fifth Embodiment

Figure 9:
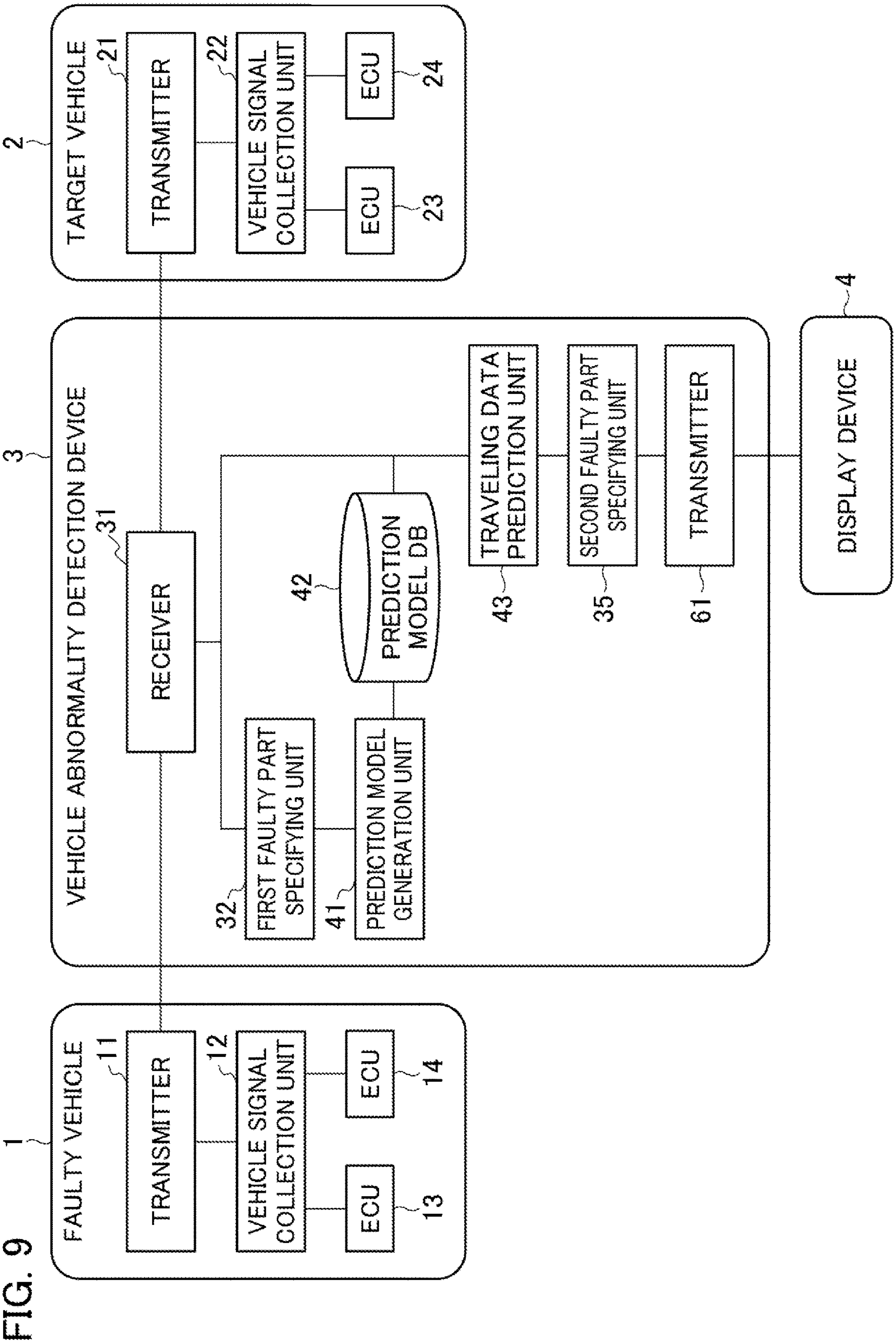
FIG. 9 is a block diagram illustrating an overall configuration of a vehicle abnormality detection system including a vehicle abnormality detection device 3 according to a fifth embodiment.

The overall configuration of the vehicle abnormality detection system including the vehicle abnormality detection device 3 according to a fifth embodiment will be described with reference to FIG. 9. The same components as those in FIG. 1 are denoted by the same reference numerals and the description thereof is omitted. The vehicle abnormality detection system in FIG. 9 differs from that in FIG. 1 in that the vehicle abnormality detection device 3 includes a prediction model generation unit 41 and a prediction model DB 42 instead of the traveling/stopping association unit 33 and the traveling/stopping signal correlation DB 34 and further includes a traveling data prediction unit 43, and the other configurations are the same.

The receiver 31 receives the first to third detection data, the fourth detection data detected from the faulty vehicle 1 while traveling in a state in which a fault has occurred, and the fifth detection data detected from the faulty vehicle 1 while traveling in a normal state in which a fault has not occurred. The prediction model generation unit 41 learns a first correlation between the first detection data and the fourth detection data, and learns a second correlation between the third detection data and the fifth detection data. Specifically, a prediction model in which the detection data at the time of stopping (first detection data and third detection data) is used as input and the detection data at the time of traveling (fourth detection data and fifth detection data) is used as output is learnt using LSTM (long short-term memory) which is an example of a recurrent neural network. The prediction model is learnt such that the predicted detection data at the time of traveling converges with the actual detection data at the time of traveling. Thus, the prediction model generation unit 41 can generate a prediction model that predicts the detection data at the time of traveling from the detection data at the time of stopping. The generated prediction model is stored in the prediction model DB 42.

Using the prediction model stored in the prediction model DB 42, the traveling data prediction unit 43 estimates the detection data of the target vehicle 1 when traveling from the second detection data of the target vehicle 1 when stopped. The second faulty part specifying unit 35 determines whether the target vehicle 2 has a fault on the basis of the estimated detection data of the target vehicle 2 when traveling.

This makes it possible to specify whether there is a fault when traveling from the detection data of the target vehicle 2 when stopped. In addition, it is also possible to confirm that a fault detected while the vehicle is traveling has been repaired and the vehicle has returned to a normal state, from the detection data at the time of stopping after the fault has been repaired.

The second faulty part specifying unit 35 (abnormality determination unit) determines whether the target vehicle 2 has a fault using the first correlation between the first detection data and the fourth detection data and the second correlation between the third detection data and the fifth detection data. This makes it possible to enhance determination accuracy by determining whether there is a fault using the correlation between detection data obtained while the vehicle is stopped and detection data obtained while the vehicle is traveling at the time of fault, and the correlation between detection data obtained while the vehicle is stopped and detection data obtained while the vehicle is traveling in a normal state.

Figure 10:
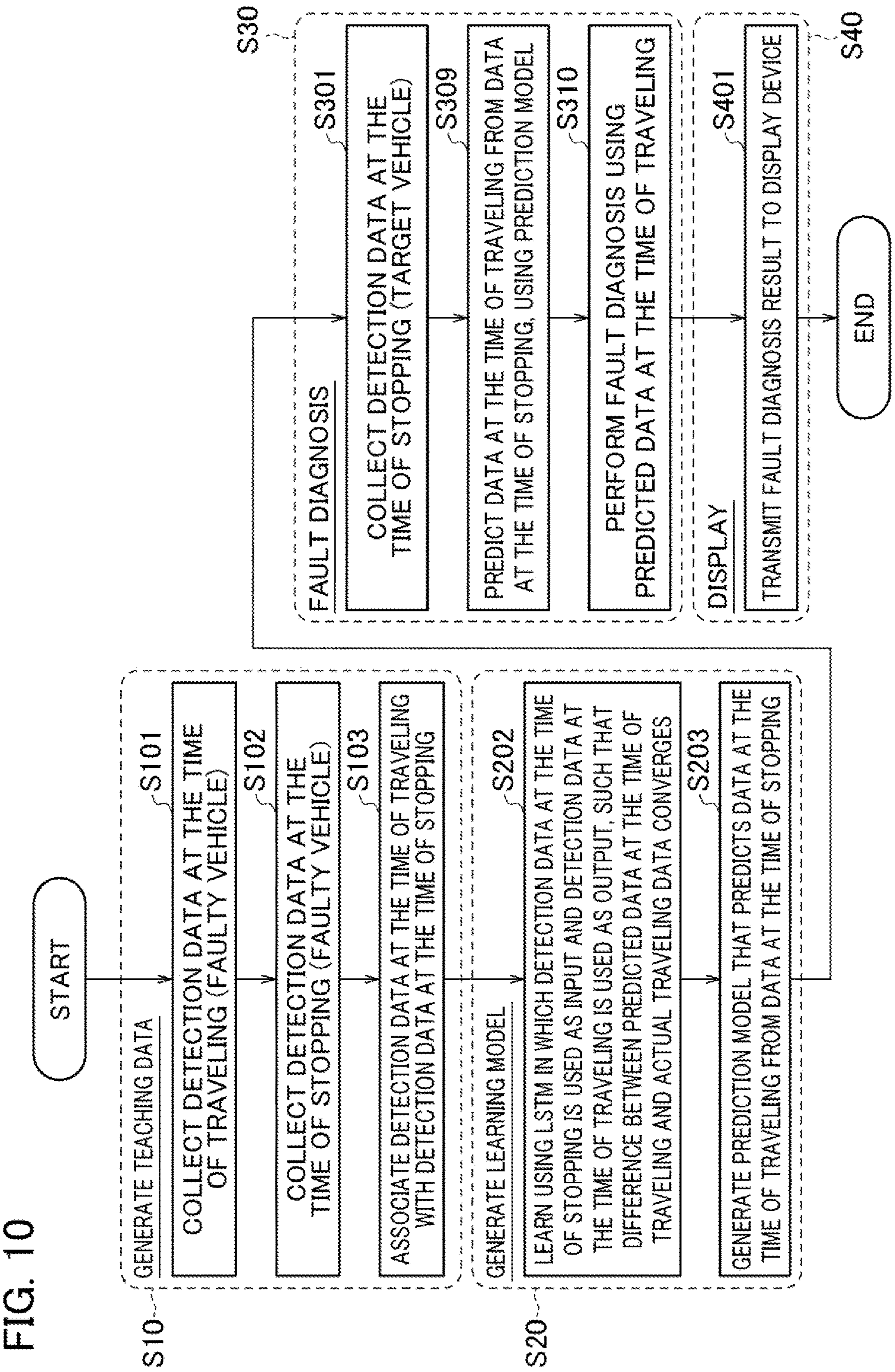
FIG. 10 is a flowchart illustrating an example of an operation of the vehicle abnormality detection device 3 in FIG. 9.

An example of the operation of the vehicle abnormality detection device 3 in FIG. 9 will be described with reference to FIG. 10. The same steps as those in FIG. 2A are denoted by the same reference numerals and the description thereof is omitted. The vehicle abnormality detection method in FIG. 10 differs in that steps S202 and S203 are performed instead of steps S104 and S201 in FIG. 2A and steps S309 and S310 are performed instead of steps S302 to S305 in FIG. 2A, and the other configurations are the same.

In step S202, the prediction model generation unit 41 learns a prediction model in which the detection data at the time of stopping is used as input and the detection data at the time of traveling is used as output, such that the detection data that is output when traveling converges with the actual detection data at the time of traveling. In step S203, the prediction model generation unit 41 generates a prediction model that predicts the detection data at the time of traveling from the detection data at the time of stopping and stores the generated prediction model in the prediction model DB 42.

In step S309, the traveling data prediction unit 43 uses the prediction model stored in the prediction model DB 42 to estimate the detection data of the target vehicle 1 when traveling from the second detection data of the target vehicle 1 when stopped. On the basis of the estimated detection data of the target vehicle 2 when traveling, the second faulty part specifying unit 35 determines whether there is a fault in the target vehicle 2.

Figure 11:
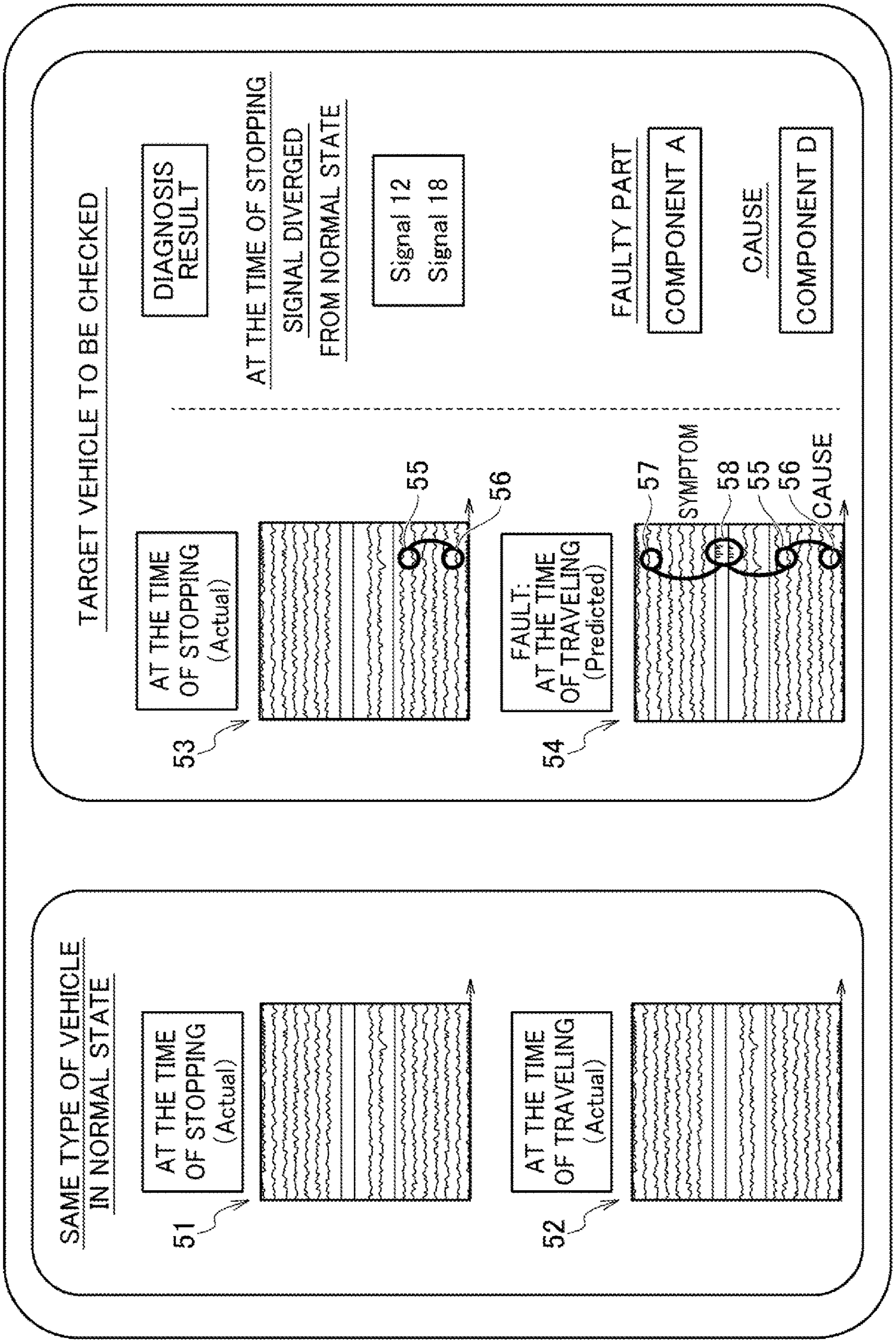
FIG. 11 is a diagram illustrating an example of a display screen of a display device 4.

An example of the display screen of the display device 4 will be described with reference to FIG. 11. In detection data 53 of the target vehicle 2 when stopped, points 55 and 56 are marked. Points 55 and 56 differ from detection data 51 of the same type of vehicle when stopped in a state in which a fault has not occurred. Then, detection data 54 of the target vehicle 1 when traveling that is predicted by the traveling data prediction unit 43 is shown. Points 55 and 56, which are the same points as those in the detection data 53 when stopped, are marked in the detection data 54 when traveling. Further, points 57 and 58 where a symptom of fault has appeared are also marked. For comparison with the detection data 54 when traveling, the detection data 52 of the same type of vehicle when traveling in a normal state is also shown. By comparing the detection data 51 when stopped with the normal states (51, 52) and comparing the detection data 51 when stopped with the predicted detection data 54 when traveling, a fault of the target vehicle 2 can be displayed convincingly and clearly. Further, by displaying the type of signals diverging from the normal condition (signal 12, signal 8) and predicted faulty parts (component A, component D), it is possible to make it easier to consider how to handle (repair) the fault.

As described above, although the embodiments of the present invention have been described, it should not be understood that the arguments and drawings forming part of this disclosure are intended to limit the present invention. Various alternative embodiments, examples, and operational techniques will be apparent to those skilled in the art from this disclosure.

When the target vehicle 2 is stationary, the transmitter 61 may transmit traveling condition information indicating a traveling condition in which a fault is expected to occur (for example, a driving speed of more than 80 km/h), to the notification device 4. Since the user of the target vehicle 2 is able to know in advance a traveling condition in which a fault is expected to occur while the target vehicle 2 is stationary, the occurrence of the fault can be suppressed, thereby increasing the safety of the vehicle.

When the target vehicle 2 is stationary, the transmitter 61 may transmit travel restriction information indicating a traveling condition limited by a fault (for example, a driving speed of 80 km/h or less), to the notification device 4. Since the user of the target vehicle 2 is able to know in advance a traveling condition limited by a fault while the target vehicle 2 is stationary, the occurrence of the fault can be suppressed, thereby increasing the safety of the vehicle.

Further, the detection data of the faulty vehicle 1 when stopped is stored in the database 34 with respect to each portion where a fault is detected, and when the second faulty part specifying unit 35 determines that the target vehicle 2 has a fault, the second faulty part specifying unit 35 estimates a component that is associated with the detection data of the faulty vehicle 1 when stopped as being an abnormal component of the target vehicle 2. This makes it possible to specify a fault that occurs in various situations as a fault in a predetermined portion.

Further, the detection data of the faulty vehicle 1 when stopped is stored in the database 34 with respect to each portion where a fault is detected, and when the second faulty part specifying unit 35 determines that the target vehicle 2 has a fault, the second faulty part specifying unit 35 estimates the type of fault that is associated with the detection data of the faulty vehicle 1 when stopped as being the type of fault of the target vehicle 2. This makes it possible to handle repairs with respect to each type of fault, even for a fault that occurs in various situations.

The faulty vehicle 1 and the target vehicle 2 may be the same vehicle. This makes it possible to perform diagnosis after classification by vehicle, thereby improving the accuracy of fault diagnosis.

LIST OF REFERENCE NUMERALS

4 Notification device (display device)
31 Receiver
34 Traveling/stopping signal correlation database (storage unit)
35 Second faulty part specifying unit (abnormality determination unit)
38 Second abnormality degree calculation unit (abnormality degree calculation unit)
41 Prediction model generation unit (learning model generation unit)
42 Prediction model DB (storage unit)
61 Transmitter

The invention claimed is:

1. A vehicle abnormality detection device comprising:
a receiver that receives:
abnormality information data indicating that an abnormality has been detected from a first vehicle while traveling;
first detection data detected from the first vehicle while stationary in a state in which the abnormality has occurred;
second detection data detected from a second vehicle while stationary, the second vehicle being different from the first vehicle, and
third detection data detected from the first vehicle while stationary in a normal state in which the abnormality has not occurred;
a storage unit that stores the abnormality information data in association with the first detection data;
an association unit configured to generate training data that associates the first detection data with a faulty part and a cause of the abnormality, where the training data is stored in the storage unit;
a learning model generation unit configured to generate a machine learning model and train the machine learning model using the training data, thereby generating a trained machine learning model;
an abnormality determination unit that determines, using the trained machine learning model, whether the second vehicle has the abnormality that is detected from the first vehicle while traveling, by calculating a precision ratio between the first detection data and the second detection data; and
a transmitter that, when it is determined by the abnormality determination unit that the second vehicle has the abnormality, transmits the abnormality information data to a notification device that is provided in the second vehicle or is related to the second vehicle,
wherein the first detection data comprises a portion of all data detected from the first vehicle while stationary, where the portion diverges from the third detection data by a predetermined value or more.

2. The vehicle abnormality detection device according to claim 1, wherein the abnormality determination unit determines there is the abnormality when similarity between the first detection data and the second detection data is equal to or greater than a threshold value.

3. The vehicle abnormality detection device according to claim 1, wherein:
the receiver further receives fourth detection data that is detected from the first vehicle while traveling in the state in which the abnormality has occurred, and fifth detection data that is detected from the first vehicle while traveling in the normal state in which the abnormality has not occurred, and
the abnormality determination unit determines whether the second vehicle has the abnormality using a first correlation between the first detection data and the fourth detection data and a second correlation between the third detection data and the fifth detection data.

4. The vehicle abnormality detection device according to claim 1, wherein the transmitter transmits traveling condition information indicating a traveling condition in which a fault is expected to occur, to the notification device when the second vehicle is stationary.

5. The vehicle abnormality detection device according to claim 1, wherein the transmitter transmits travel restriction information indicating a traveling condition limited by a fault, to the notification device when the second vehicle is stationary.

6. The vehicle abnormality detection device according to claim 1, further comprising an abnormality degree calculation unit that calculates an abnormality degree of the second vehicle obtained by quantifying an amount of deviation from a normal state, wherein the transmitter transmits the abnormality degree of the second vehicle to the notification device.

7. The vehicle abnormality detection device according to claim 1, further comprising an abnormality degree calculation unit that calculates an abnormality degree obtained by quantifying an amount of deviation from a normal state, wherein the abnormality degree calculation unit:
calculates an abnormality degree of the first vehicle,
stores the abnormality degree of the first vehicle in association with the first detection data in the storage unit,
calculates an abnormality degree of the second vehicle,
calculates a relative value of the abnormality degree of the second vehicle based on the abnormality degree of the first vehicle, and
the transmitter transmits the relative value to the notification device.

8. A vehicle abnormality detection method comprising:
receiving abnormality information data indicating that an abnormality has been detected from a first vehicle while traveling and first detection data detected from the first vehicle while stationary in a state in which the abnormality has occurred;

receiving second detection data detected from a second vehicle while stationary, the second vehicle being different from the first vehicle;

receiving third detection data detected from the first vehicle while stationary in a normal state in which the abnormality has not occurred;

storing the abnormality information data in association with the first detection data;

generating training data that associates the first detection data with a faulty part and a cause of the abnormality, storing the training data in a storage unit;

generating a machine learning model and training the machine learning model using the training data, thereby generating a trained machine learning model;

determining, using the trained machine learning model, whether the second vehicle has the abnormality that is detected from the first vehicle while traveling, by calculating a precision ratio between the first detection data and the second detection data; and when it is determined that the second vehicle has the abnormality based on the precision ratio, transmitting the abnormality information data to a notification device that is provided in the second vehicle or is related to the second vehicle, wherein the first detection data comprises a portion of all data detected from the first vehicle while stationary, where the portion diverges from the third detection data by a predetermined value or more.

* * * * *